United States Patent [19]

Pavlik

[11] Patent Number: 5,362,928

[45] Date of Patent: Nov. 8, 1994

[54] SCALE WITH ROLLING-FULCRUM AND CYLINDRICAL-WEIGHTS

[76] Inventor: John P. Pavlik, 20411 Lassen St., Chatsworth, Calif. 91311

[21] Appl. No.: 76,416

[22] Filed: Jun. 14, 1993

[51] Int. Cl.⁵ .............................................. G01G 1/18
[52] U.S. Cl. ...................................... 177/172; 177/251
[58] Field of Search ................................ 177/172, 251

[56] References Cited

U.S. PATENT DOCUMENTS

| | | | |
|---|---|---|---|
| 243,753 | 7/1881 | Barton | 177/251 X |
| 308,440 | 11/1884 | Smith | 177/251 |
| 594,911 | 12/1897 | Seaman | 177/251 |
| 601,224 | 3/1898 | Eaton | 177/251 X |
| 1,126,398 | 1/1915 | Cleophas | 177/251 X |
| 1,511,404 | 10/1924 | Fiedler | 177/251 X |
| 1,872,646 | 8/1932 | Behrens | 177/251 X |
| 2,284,526 | 5/1942 | Linsley | 177/251 X |
| 3,224,516 | 12/1965 | Stelzer | 177/251 X |
| 3,365,011 | 1/1968 | Heil | 177/172 |
| 3,759,337 | 9/1973 | Luedke et al. | 177/172 |
| 4,384,629 | 5/1983 | Kotzin | 177/251 X |
| 4,840,241 | 6/1989 | Ishikawa | 177/172 |

Primary Examiner—George H. Miller, Jr.

[57] ABSTRACT

For mailing use, a balance scale devoid of springs, electrical components, gradations, indicia and moveable pointers. Said scale is designed for use in determining postage due for UNITED STATES POSTAL SERVICE:
1. FIRST CLASS MAIL wherein postage fee is based on one ounce minimum weight and one ounce weight increments up to and including eleven ounce
2. PRIORITY MAIL wherein there is a single fee for mail weighting more than eleven ounces but not more than two pounds.

6 Claims, 3 Drawing Sheets

SCALE WITH ROLLING-FULCRUM AND CYLINDRICAL-WEIGHTS

BACKGROUND OF THE INVENTION

Postal scales in general domestic use are of the spring type and their most general use is for weighing letter mail of approximately one ounce. Frequently, after some use, these scales get an unloaded reading of more than zero. The fact that the unloaded reading is not accurate and the fact that there is often the difficult visual task of determining where a pointer is located amongst close gradation lines often causes a person to either affix an extra stamp to be sure of correct postage or causes incorrect reading with resultant insufficient stamping of the mail. This insufficient stamping causes the POSTAL SERVICE to waste time from its high volume, automated processing to individually reject the mail, make proper notation and then return it to sender; the mailer then wastes time and money in placing the mail in a new, properly addressed and stamped enclosure and mail delivery time has been prolonged. Electronic scales are expensive for home use and there is always the need to set a proper unloaded zero reading and check on the condition of a battery.

There is need for a simple inexpensive mechanical domestic mail scale that maintains an accurate zero reading after prolonged intensive use and after long periods of non-use; a scale that accurately determines postage due without necessitating a judgement based on the difficult visual task of determining where a moveable indicator is positioned on a background of fine and close gradation lines.

SUMMARY OF THE INVENTION

The instant invention is a lever in the form of an elongate rigid slab with a rigid round rod, functioning as a rolling fulcrum, attached to the lever underside transversely to lever length at lever mid-length. On the upper surface, near the end of each arm of the lever a "V" channel is cut equidistant from the fulcrum and transverse to the length of the lever. Below the lever and fulcrum is a base made from a rigid slab that is slightly longer and much wider than the lever. On its upper surface the base has a hard, straight rail horizontally fixed and spaced so that each end section of the rolling fulcrum rolls on a rail when the rolling fulcrum is positioned above the mid-length line of the base. As the lever tilts up and down the fulcrum rolls on these rails. A heavy nylon line arched over each end of the fulcrum and anchored in the base keeps the fulcrum from rolling off or being jostled off the rails. A short length of heavy nylon line is anchored in vertical position in the base at each butt end of the fulcrum so as to limit fulcrum end thrust. This invention is based on the fact that ten U.S. pennies rolled in an adhesive type tape weigh approximately 0.97 ounces and form a cylindrical roll that can be placed in a "V" cut channel so as to register its mass at the linear bottom of the "V" and on the fact that letter mail in approximately vertical position can be set into a like "V" cut on the other side of a fulcrum and register its mass at the linear bottom of the "V" cut. The simple method of balancing the unloaded lever of this invention is by means of an elongate body that is mounted at one of its ends to the top surface of the lever so that it pivots on a plane parallel to lever top surface at a point where mid-length and mid-width lines of the lever meet. This elongate body is rotated to a position at which the unloaded lever is balanced. Mounted in the base, close to each "V" cut in the lever, is a mail rest that functions to hold letter mail placed in the "V" cut in almost vertical position. Use of this invention to measure the most common type of domestic mail, letter mail:

Letter mail is placed in either of the "V" cuts and allowed to lean in essentially vertical position against a mail rest whereupon the mail loaded end of the lever drops to a stop position. Ten-penny rolls are added to the opposing "V" cut one by one, up to and including an eleventh roll, until the mail end rises. The minimum number of rolls needed to make the mail-end rise indicates the number of ounces for which FIRST CLASS postage is due. A "V" cut can hold as many as eleven ten-penny rolls by rolling the rolls tightly in a common sheet of paper like typing or note-book paper and tightly twisting both ends so as to form a fairly rigid cylinder shape. If a double check is desired the positions of rolls and mail can be interchanged. Since a ten-penny roll averages 0.97 ounces there is margin for correct postage calculation. For FIRST CLASS mail that does not have at least one essentially straight, thin edge that will sit in the bottom of a "V" cut and for mail over eleven ounces the mail loading provision is:

1. For first-class mail that does not have a thin straight edge,
    a. under the linear bottom of each "V" cut an eye-screw is anchored to the underside of the lever,
    b. in the base, under each eye-screw, a hole is cut through,
    c. a length of wire with a crook at each end is sized so that when one of the base holes is moved past the edge of the scale-supporting surface the double-crooked wire can be inserted up through the base hole so as to engage the eye-screw and protrude below the base hole.

A plastic bag containing the mail is hooked onto the lower crook, causing the mail-loaded end of the lever to drop down to its stop. Up to eleven ten-penny rolls are loaded onto the "V" cut on other lever arm, one by one, so as to cause the mail loaded arm to rise. The minimum number of rolls needed to cause this action indicate the number of ounces for which first-class mail is due.

2. For mail weighing over eleven ounces but not more than two pounds (Priority Mail).
    a. An eye-screw is attached to the underside of one of the lever arms (first arm) at a distance from the fulcrum at which eleven ten-penny rolls loaded onto the "V" cut on the other lever arm (second arm) will be in balance with a two pound mail load suspended from the eye-screw.
    b. A hole is cut through the base, under the eye-screw, so that when this hole is moved past the edge of the platform on which the scale is sitting the same double-crooked wire used for first-class mail can be inserted up through the hole so as to engage the eye-screw so that a plastic bag containg mail can be hooked onto the bottom crook so as to cause the mail-loaded arm (first-arm) of the lever to drop down to its stop. Eleven ten-penny rolls rolled in a sheet of 8½×11 typing paper that is sealed at each end by twisting it are placed in the "V" groove in the other (second) arm of the lever. If the mail-loaded lever-arm (first arm) rises from its stop it indicates that the mail does not weigh over two pounds and so is eligible for Priority Mail rate.

One object of this invention is to save time and money for the mailer by eliminating doubt as to correct postage required and so averting the practice of either affixing an extra stamp to be sure of adequate postage or not affixing enough postage with the result that mail is returned to the sender for re-stamping.

Another object of this invention is to eliminate the time and money wasted by the POSTAL SERVICE when it must interrupt a highly automated, high volume mail-processing procedure to individually identify, label, stamp cancel and then return individual mail to a sender for insufficient postage.

DESCRIPTION OF THE PREFERRED EMBODIMENT

For a better understanding of the instant invention reference is made to the following description taken in connection with the accompanying drawings and its scope will be pointed out in the appended claims.

Figure 1:
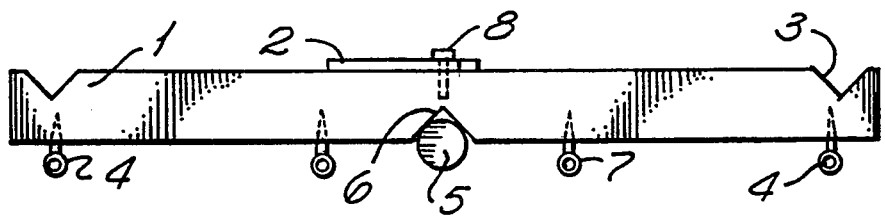
FIG. 1 is a side view of a slab of wood, modified to become the lever component of this invention, showing a butt-end view of the fulcrum component, the fulcrum attached transversely to the slab underside at slab mid-length, the lever balancer, transverse "V" cuts in the slab top surface, a transverse "V" cut in which the fulcrum is attached to lower slab surface and four eye-screws anchored in the slab underside.
Figure 2:
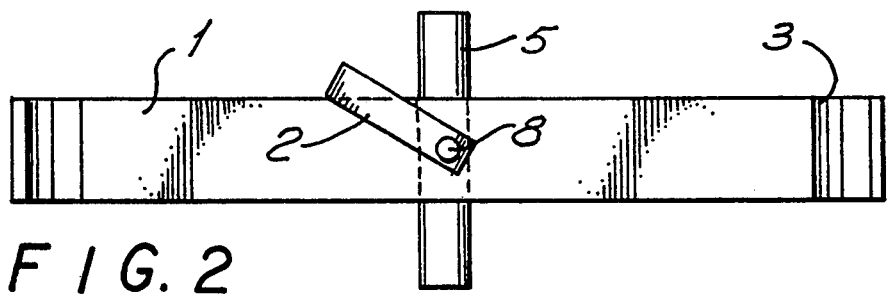
FIG. 2 is a top plan view showing all of the components shown in FIG. 1 except the "V" cut anchor for the fulcrum and the four eye-screws.

Making the lever component:

The tilting platform which functions as a lever 1 of FIGS. 1, 2, 5, 6, 8, 9, 10 is made from an oblong slab of wood 3" wide, 30 centimeters long and $\frac{5}{8}$" thick that is modified as follows:

1. On the top surface, 10 mm from each end a transverse "V" cut is made with a 90° router cutter or a saw blade set at 45° so that the linear bottom of the "V" cut 3 of FIGS. 1, 2 is 5 mm deep and 15 mm from the end.

2. On the bottom surface, at mid-length, a transverse "V" cut 6 of FIGS. 1, 6 approximately $\frac{1}{4}$" deep is made with a 90° router cutter or saw blade set at 45°.

3. Below each of the top surface "V" cuts an eye-screw 4 of FIG. 1 is anchored into the bottom surface at slab mid-width and directly under the linear bottom of each "V" cut.

4. On the slab underside, on the mid width line, distanced 46.4 mm on each side from the linear bottom of the underside "V" cut 6 of FIG. 1 an eye-screw 7 of FIG. 1 is anchored. This positioning is based on the law of levers wherein force times arm length=force time arm length in a balanced lever.

The linear bottom of each top surface "V" cut is 135 mm from the linear bottom of the underside "V" cut which will function as a seat into which the fulcrum will be attached.

11 oz. in a top side "V" cut×135 mm lever arm length=1485

32 oz. (2 lbs.) hanging from a 46.4 mm lever arm=1484.8

5. Into a metal strip $\frac{1}{2}$"×2"×$\frac{1}{8}$", 2 of FIGS. 1, 2, 5, 9, 10 a 1/16" hole is drilled $\frac{1}{4}$" from one of the ends on the mid-width line. By means of a brad 8 of FIGS. 1, 2, 5, 9, 10 through the hole the strip is attached to the top surface of the slab at the intersection of the mid-length and mid-width lines of the slab so as to function as the lever balancer that can be rotated anywhere within 360° to achieve lever balance.

6. With epoxy glue a metal rod 5$\frac{1}{4}$" long and $\frac{1}{4}$" in diameter 5 of FIGS. 1, 2, 5, 6, 8, 9, 10 is transversely affixed by seating it in the bottom-side "V" cut of the slab so that 1$\frac{1}{8}$" of the rod projects on each side of the slab.

Making the base:

The base 9 of FIGS. 3, 4, 5, 8, 9, 10 is made of an oblong slab of wood 12"×6"×$\frac{5}{8}$" that has been modified as follows:

1. A $\frac{1}{4}$" length of $\frac{1}{4}$" diameter wood dowel 10 of FIGS. 3, 4, 5, 6, 8, 9, 10 is glued on the top surface on the mid-width line $\frac{5}{8}$" from each end.

2. Centered on slab mid-line and 9/16" from each end a $\frac{3}{4}$ hole 14 of FIGS. 3, 4, 5, 6, 8, 9 is cut through.

3. Centered on slab mid-width line and 1$\frac{7}{8}$ from slab mid-length line a $\frac{5}{8}$" hole 15 of FIGS. 3, 4, 5, 6, 8, 9 is cut through on each side of the mid-length line.

4. At the four intersections of lines running 1" in from and parallel to each long side and lines running 1" in from and parallel to each end a perpendicular 3/32 hole is drilled. In these holes are anchored mail-rest 17 of FIGS. 3, 4, 5, 6, 8, 9, 10 which are made by bending a 20" length of 16 gauge steel wire into an inverted "U" with a 4" cross bar and 8" legs.

Figure 4:
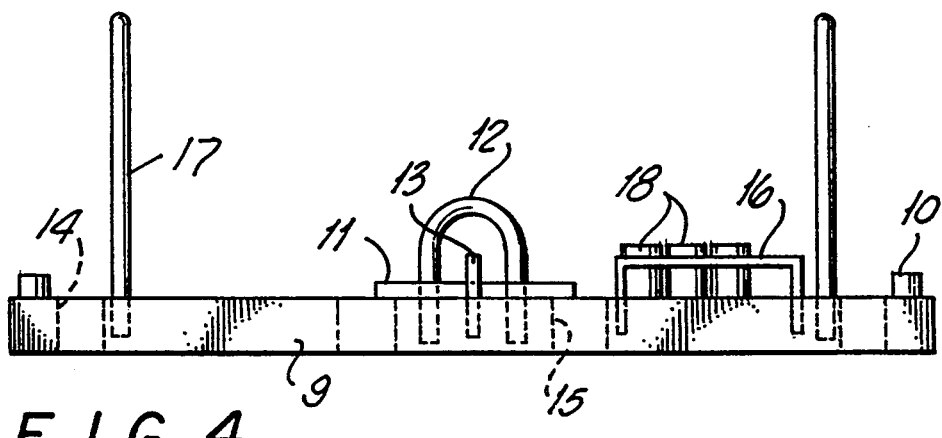
FIG. 4 is a side view of the base shown in FIG. 3 with the addition of 3 ten-penney roll components of this invention.
Figure 5:
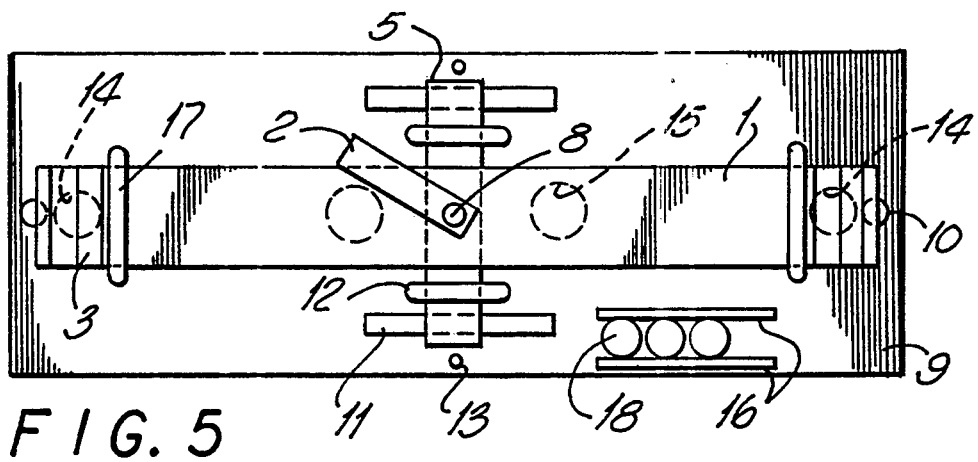
FIG. 5 is a top plan view showing the lever component shown in FIG. 2 assembled onto the base component shown in FIG. 3 with the addition of 3 ten-penney roll components of this invention.

5. A penny-roll holder 16 of FIGS. 4, 5, 6, 8, 9 for penny-rolls 18 of FIGS. 4, 5 is made and attached to the slab top surface as follows:

a 4$\frac{1}{2}$" length of 14 gauge steel wire is bent at right angles 1$\frac{1}{8}$" from each other by rotating the ends each other on the same plane to form a broad "U" with 1$\frac{1}{8}$" legs and a 2$\frac{1}{4}$" cross-bar. A second such wire form is fashioned. At one end of the slab, at the intersections of lines $\frac{1}{4}$" from and parallel to one of the long sides, $\frac{7}{8}$"

from and parallel to the same side, 2" from and parallel to the adjoining end, 4¼" from and parallel to the same adjoing end 3/32" perpendicular holes are drilled into the top side of the slab, ¼" deep. The legs of the two wire forms are anchored in these holes so the cross-bar members of these forms are parallel so as to form the ten-penney holder 16 of FIGS. 3, 4, 5, 6, 8, 9. Since a ten-penny roll is ¾" in diameter and the horizontal crossbars of the holder are ⅝" high and ⅝" apart the bars will hold the rolls by entraptment and wire tension when a roll is snapped down into place between the bars.

6. At the intersection of lines running ¼" from and parallel to the long sides of the base slab and its transverse mid-length line 3/32" holes are drilled ¼" deep into and perpendicular to its top surface. Into each of these two holes a 1" length of 0.095 nylon line 13 of FIGS. 3, 4, 5, 6, 8, 9, 10 is anchored to function as an end-thrust limiter for the fulcrum 5.

7. ⅝" in from and parallel to each long side of the slab a 1" length of straight 14 gauge steel wire 11 of FIGS. 3, 4, 5, 6, 8, 9, 10 is glued with epoxy to the top surface so that it is bisected by the slab mid-length line. The fulcrum rolls on this rail.

8. On each line that rums ¾" from and parallel to the long sides of the slab, at points that are ⅝" from the transverse mid-length line, and so 6/8" apart, 3/32" perpendicular holes are drilled ¼" deep into the top surface. a 2½" length of 0.095 nylon line is bent into an inverted "U" shape 12 of FIGS. 3, 4, 5, 6, 8, 9, 10 and the legs thus formed are inserted into the holes so as to function as a roll limiter for the fulcrum.

Figure 7:
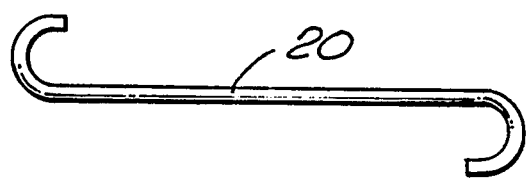
FIG. 7 shows the suspensor component of this invention.
Figure 8:
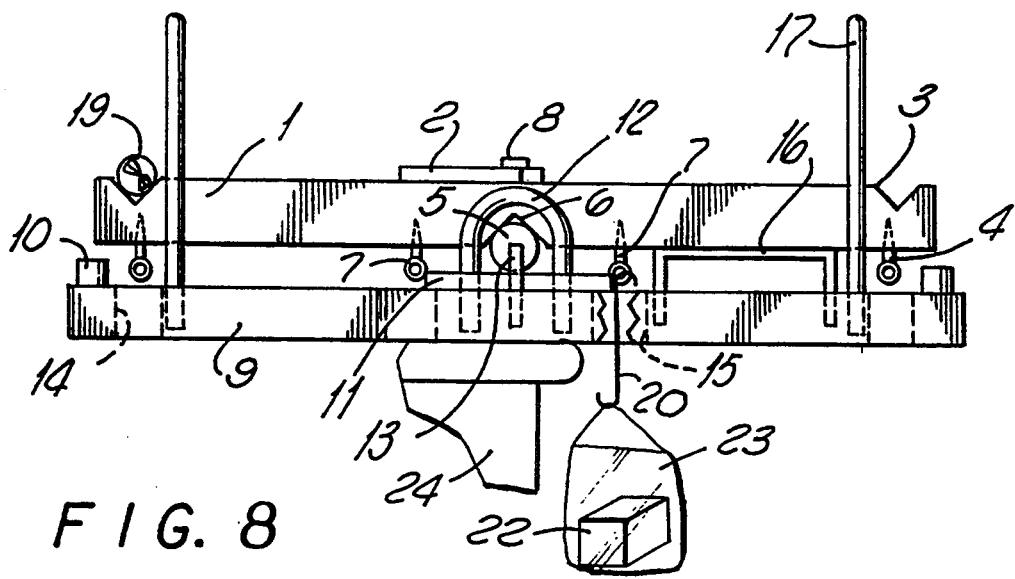
FIG. 8 is a side view of the complete invention positioned partly past the edge of a supporting platform to effect its use in weighing a suspended object weighing over 11 ounces.
Figure 9:
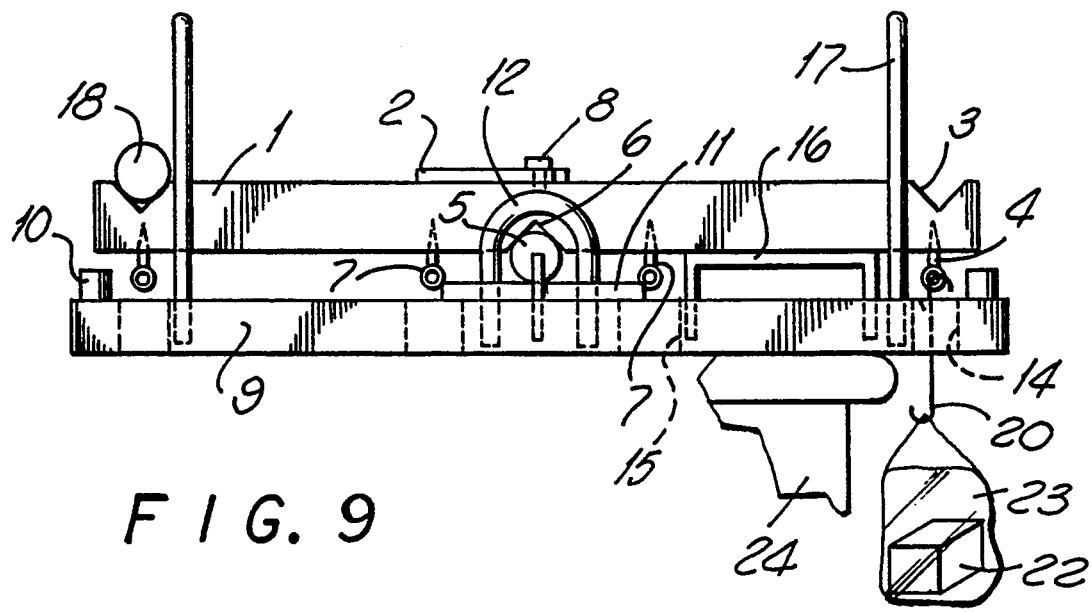
FIG. 9 is a side view showing FIRST-CLASS MAIL (11 oz. or less.) being weighed.
Figure 10:
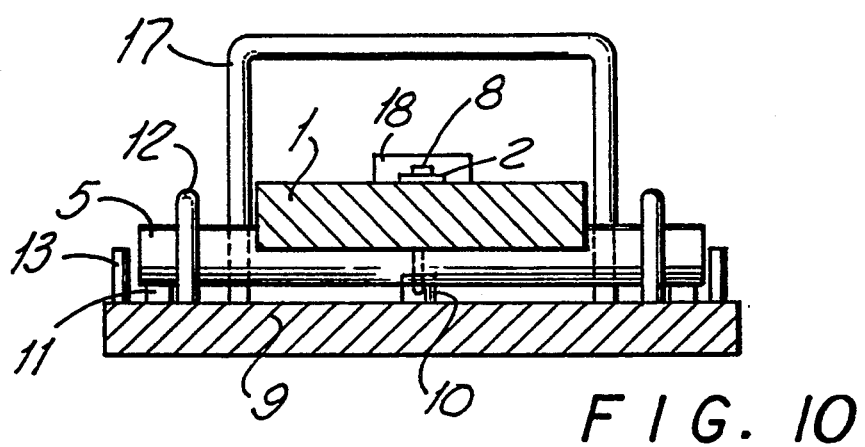
FIG. 10 is a transverse sectional view taken upon the plane of sectional line 25—25.

Making the suspensor 20 of FIGS. 7, 8, 9.

A 3¼" length of 14 gauge steel wire is bent into a crook at each end to produce a suspensor 20 of FIGS. 7, 8, 9 that can be hooked onto an eye-screw 4, 7 of FIGS. 8, 9 and hooked by means of the lower crook into a mail-containing plastic bag 28 of FIGS. 8, 9.

Assembling the lever onto the base.

Figure 3:
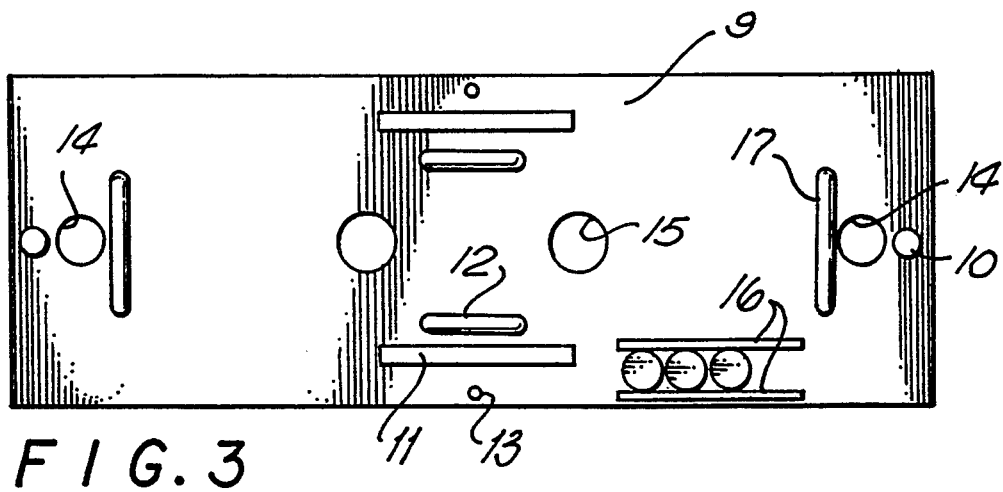
FIG. 3 is a top plan view of a slab of wood modified to become the base for the lever component shown in FIGS. 1 and 2.

One leg of each of the fulcrum containers 12 of FIG. 3 is removed from its anchor hole. The lever shown in FIG. 2 is slipped betwee the uprights of the mail-rests 17 of FIG. 3 and the fulcrum 5 of FIG. 2 is set on the fulcrum rails 11 of FIG. 3. The removed legs of the fulcrum container are reinserted into their anchor holes. Ten-penny rolls 18 are set into the holder 16 FIG. 5 and the scale is ready for the weighing process.

The weighing procedure.

Although the most common use of this scale will entail the use of only one or two ten-penny rolls to weigh letter mail, a "V" cut can hold up to 4 individual ten-penny rolls and up to 11 ten-penny rolls when they are tightly rolled in a sheet of typing paper and the ends of the roll are tightly twisted.

Figure 6:
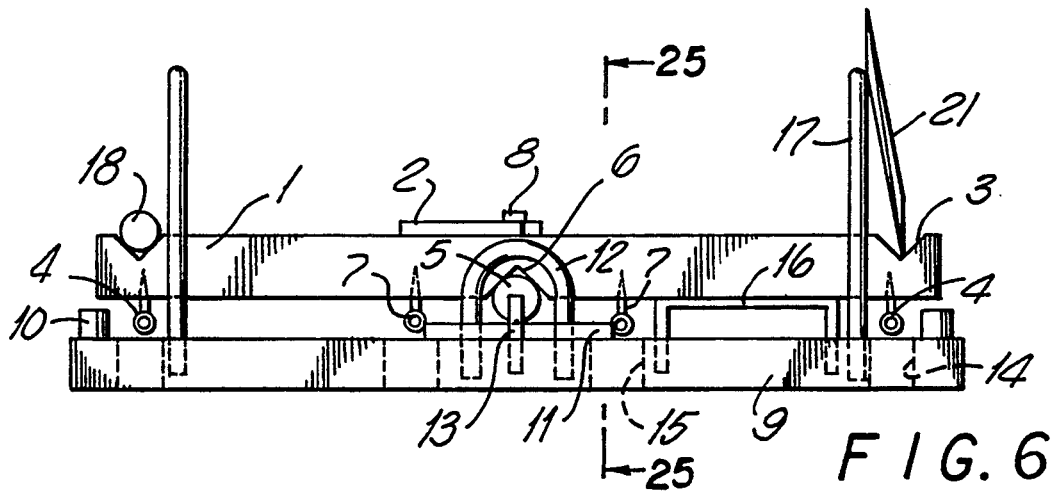
FIG. 6 is a side view of the lever component of this invention assembled in working articulation atop the base component of this invention showing a ten-penney roll component in a first lever arm "V" cut and an object with at least one thin, straight edge sitting in the bottom of a "V" cut in a second lever arm in the process of being weighed.

The balancer 2 of FIGS. 1, 2, 5, 6, 8, 9, 10 is rotated until the unloaded lever 1 of FIG. 5 is balanced. A letter 21 of FIG. 6 is rested on its in a "V" 3 with its upper end resting in neat vertical position on a mail rest 17. This will cause the mail-loaded end of the lever 1 to drop to stop 10. Ten-penny rolls 18 of FIG. 6 are loaded onto the opposite "V" cut one by one until the mail loaded end of the lever is raised from its dropped position. The minimum number of rolls needed to raise the mail-loaded end from its dropped position indicates the number of ounces for which postage is due. To double check for accuracy the positioning the mail and ten-penny rolls can be interchanged. Since a ten penny roll averages 0.097 ounces there is a 0.03 ounce margin of safety to assure adequate postage.

Figure 11:
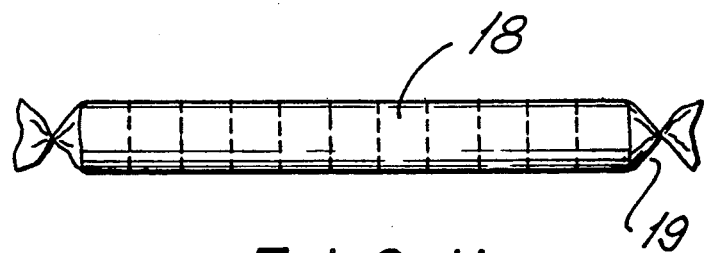
FIG. 11 shows a sheet of paper wrapped around eleven ten-penny rolls to form a cylinder with twisted paper ends.

To weigh mail that weighs 11 ounces or less but does not have at least one straight, thin end, one of the ends of the scale is moved past the edge of the platform on which it is sitting 24 of FIG. 9 until the base hole 14 as shown in FIG. 9 is past the platform edge. As shown in FIG. the suspensor 20 is hooked onto the eye-screw 4 by upward insertion through base hole 14 and a plastic bag 23 is hooked onto the lower crook of the suspensor 20. The balancer 2 is rotated until the suspensor and bag loaded scale is balanced. Mail to be weighed 22 is placed in the plastic bag, causing the mail-loaded end of the lever to drop to its stop Up to 11 ten-penny rolls are placed one by one in the "V" cut at the raised end of the lever until the mail-loaded lever-end rises. The minimum number of ten-penny rolls needed to raise the mail end indicates the number of ounces for which postage is due. If a load of 11 ten-penny rolls does not raise the mail-loaded end from its stop then the mail not eligible for FIRST-CLASS mailing and so must be weighed further determine eligibility for PRIORITY MAIL AS SHOWN IN FIG. 8 wherein the scale has been moved past the edge of its supporting platform until the base hole 15 is past the platform edge. By upward insertion the suspensor 20 is is inserted through the base hole 15 and hooked onto the eye-screw 7. A plastic bag 23 is hooked onto the lower crook of the suspensor and the thus suspensor-bag loaded lever is balanced by rotating the balancer 2 to the required position. Eleven ten-penny rolls are tightly rolled in a sheet of typing paper of which the ends are tightly twisted 19 of FIGS. 8, 11 and the roll is set into the "V" cut at the scale-end that is sitting on the table. The thus penny-roll loaded end of the lever will drop its stop 10. Mail 22 is then placed in the suspended bag 23. If the mail-loaded end does not fall to rest on its stop it is indicated that the mail weighs 2 pounds or and so is eligible for Priority Mail postage rate. If the mail-loaded end drops to rest on its stop it is indicated that the mail weighs more than 2 pounds and so is not eligible for Priority Mail postage rate.

What is claimed is:

1. A lever type scale comprising:
    a) a first oblong rigid slab having broad surfaces horizontally disposed, functioning as two arms of a lever and modified with a transverse "V" cut on its top surface near to and equidistant from each of its ends,
    b) a dowel-shaped rod transversely affixed to the underside of said first slab at slab mid-length so as to demarcate the two lever arms of the first slab and function as a fulcrum,
    c) a means for attaching an object to the underside of the first slab directly below the linear bottom of each "V" cut,
    d) a means for attaching an object to the first slab underside at one determined point on each side of and equidistant from the fulcrum,
    e) a means for balancing the first slab in its tilting movement on the fulcrum,
    f) a second oblong rigid slab having broad surfaces horizontally disposed, located beneath the first slab and functioning as its base, having vertical passages through located so as to be beneath each said underside attachment point on the first slab and having on its top surface:
        1) a low friction means of supporting the fulcrum and limiting its movement,
        2) a means for limiting the tilting movement of the first slab, 3) one anchored upright near each "V" cut in the first slab, functioning to support objects placed in said "V" cuts in first slab in almost vertical position.
4) a means for holding more than one cylindrical shaped weights that are essentially the same size in diameter, g) an elongate object with means at one end for attachment to any of the attachment means on first slab underside, having length to pass from its attachment to first slab underside through a passage in the second slab and having its lower end formed into a crook hanging below the second slab so as to function as a suspensor, h) a means for suspending an object from the crook of the suspensor, i) more than one cylindrical shaped weights, each weight essentially the same size and mass, j) a means for containing at least two of said weights end to end so as to form a cylinder having approximate diameter of a weight, having approximate length of total length, of all the weights and having weight of approximate mass of all the weights, whereby after said first slab has been balanced and an object to be weighed having at least one straight, thin edge has been set into a "V" cut in a first lever arm so that the straight, thin edge is resting in the linear bottom of the "V" cut and its upper end is leaning in near vertical position on the close-by upright that is anchored in the second slab the object-loaded first lever arm will drop down to its stop so that placing said cylindrical weights onto the "V" cut in the second lever arm one by one until the first lever arm rises from its stop will indicate that the thin, straight edged object weighs less than the total mass of the cylindrical weights, so that in its near vertical leaning position the now-raised object can be moved, by the light touch of one finger, away from the upright and slightly past an absolute vertical position to see if it still remains raised.

2. A lever type scale as claimed in claim 1 and said first slab having said suspensor attached to said attachment means at a determined point at underside of a first lever arm is then balanced so that an object suspended from the crook of the suspensor causes the first lever arm to drop to its stop, so that upon placement of a cylindrical shaped weight of known mass in the "V" cut of the second lever arm if the object-laden first lever arm remains dropped on its stop the object is known to be heavier than the cylindrical weight, if the object laden first lever arm rises from its dropped-stopped position the object is known to be lighter than the cylindrical weight.

3. A device as defined in claim 1 wherein said fulcrum is of metal, the means of attaching an object to the first slab underside directly below the linear bottom of each "V" cut is an eye-screw anchored in the slab underside directly below the linear bottom of each "V" cut, the means for attaching an object to the slab underside at one determined point on each side of and equidistant from said fulcrum is an eye-screw anchored into the slab underside at each of said determined points, the means for balancing the first slab is a rigid strip that is pivotal at one of its ends on an axis that is perpendiculat to the slab top surface—said axis positioned on top surface where slab mid-length and mid-width lines intersect so that said rigid strip can be rotated to any resting position on slab-top surface that will effect slab balance, the second slab is wider and longer than the first slab, the low friction means for supporting the fulcrum and limiting its movement is a hard rail immovably positioned on each side of the top surface of the second slab so as to support each end of the fulcrum as it rolls back and forth on the rail, a length of synthetic line arched over the fulcrum near to each end and anchored in the second slab top surface, a length of synthetic line vertically anchored in second slab top surface next to each butt end of the fulcrum, said means for limiting the tilting movement of the first slab is a component that is smaller in any of its dimensions than the radius of the fulcrum and is positioned immovably on the top surface of the second slab near each end so as to be beneath each end of the first slab, each of said two uprights is a length of wire formed into an inverted "U" having legs of each "U" anchored in top-side of second slab so that each end of the first slab is straddled by a "U" upright having the "U" cross-bar almost directly above and approximately parallel to the linear bottom of a "V" cut, said means for holding more than one of the cylindrical shaped weights that are essentially the same size is a component attached to the top surface of the second slab and having its upper part formed into two parallel forms that are spaced-apart and distanced from the slab surface less than the diameter of said cylindrical weight, said elongate component functioning as a suspensor passing through one of said passages is formed into a crook at its upper end as means of attachment to a screw eye on first slab underside and a crook at its lower end, said means for suspending an object from the lower crook of the suspensor is a bag that is hooked at its open end onto the lower crook so that the object can be contained within, said cylindrical weight is comprised of more than one approximately same shape, size and weight discs rolled tightly in adhesive type tape so as to form a cylinder, means of containing more than one of said cylindrical weights end to end so as to form a cylinder is a sheet of paper tightly rolled around said weights and twisted tightly at the paper roll ends.

4. A device as described in claim 3 wherein said means for holding more than one cylindrical weight is two lengths of wire, each bent into a broad inverted "U" and having legs of each "U" anchored in the top side of the second slab so that the cross-bars of the "U"s are parallel to each other and the top surface of the slab and spaced-apart and from-the-slab top surface less than the diameter of a cylindrical weight, said bag is of plastic and said suspensor is made of wire.

5. A device as described in claim 4 wherein said first and second slabs are made of wood, the rails supporting the fulcrum are of straight wire affixed to the second slab surface parallel thereto and to the slab long side, the synthetic line arched over the fulcrum is of nylon and the synthetic line at the butt end of the fulcrum is of nylon, the means for limiting the tilting movement of the first slab is a stub of wooden dowel rod, the discs making up one cylindrical weight are ten United States pennies.

6. A device as described in claim 4 wherein said first and second slabs are of plastic, the rails supporting the fulcrum are of plastic, the lines arched over the fulcrum are of plastic, the line at each butt-end of the fulcrum is plastic and the means for limiting the tilting movement of the first slab is plastic.

* * * * *